United States Patent
Chebiyyam

(10) Patent No.: US 9,077,684 B1
(45) Date of Patent: Jul. 7, 2015

(54) SYSTEM, METHOD, AND COMPUTER PROGRAM PRODUCT FOR DETERMINING WHETHER AN ELECTRONIC MAIL MESSAGE IS COMPLIANT WITH AN ETIQUETTE POLICY

(75) Inventor: Gopi Krishna Chebiyyam, Hyderabad (IN)

(73) Assignee: McAfee, Inc., Santa Clara, CA (US)

( * ) Notice: Subject to any disclaimer, the term of this patent is extended or adjusted under 35 U.S.C. 154(b) by 691 days.

(21) Appl. No.: 12/187,207

(22) Filed: Aug. 6, 2008

(51) Int. Cl.
*G06F 15/00* (2006.01)
*G06F 13/00* (2006.01)
*H04L 29/06* (2006.01)
*G06F 21/62* (2013.01)

(52) U.S. Cl.
CPC ........ *H04L 63/0245* (2013.01); *G06F 21/6218* (2013.01)

(58) Field of Classification Search
CPC .............................. G06Q 10/10; G06Q 10/00
USPC .............. 715/705.1, 765, 740, 851, 853, 862, 715/732, 769, 709; 709/206, 209, 226
See application file for complete search history.

(56) References Cited

U.S. PATENT DOCUMENTS

| | | | |
|---|---|---|---|
| 4,797,447 A | 1/1989 | Gergen et al. | |
| 5,195,086 A | 3/1993 | Baumgartner et al. | |
| 5,280,527 A | 1/1994 | Gullman et al. | |
| 5,485,068 A | 1/1996 | Vaught | |
| 5,572,694 A | 11/1996 | Uchino | |
| 5,796,948 A | 8/1998 | Cohen | 395/200.36 |
| 5,845,068 A | 12/1998 | Winiger | |
| 5,941,915 A | 8/1999 | Federle et al. | |
| 5,987,610 A | 11/1999 | Franczek et al. | |
| 6,073,142 A | 6/2000 | Geiger et al. | |
| 6,081,265 A | 6/2000 | Nakayama et al. | |
| 6,177,932 B1 | 1/2001 | Galdes et al. | |
| 6,240,417 B1 | 5/2001 | Eastwick et al. | |
| 6,367,019 B1 | 4/2002 | Ansell et al. | |
| 6,460,050 B1 | 10/2002 | Pace et al. | |
| 6,658,566 B1 | 12/2003 | Hazard | |
| 6,718,367 B1 | 4/2004 | Ayyadurai | |
| 6,741,851 B1 | 5/2004 | Lee et al. | |
| 6,820,204 B1 | 11/2004 | Desai et al. | |
| 6,934,857 B1 | 8/2005 | Bartleson et al. | |
| 6,957,330 B1 | 10/2005 | Hughes | |
| 6,961,765 B2 | 11/2005 | Terry | |
| 7,023,816 B2 | 4/2006 | Couillard | |

(Continued)

FOREIGN PATENT DOCUMENTS

| | | |
|---|---|---|
| GB | 2411330 | 8/2005 |
| WO | WO 02093410 | 11/2002 |
| WO | WO 2006/076536 | 7/2006 |

OTHER PUBLICATIONS

U.S. Appl. No. 11/850,432, filed Sep. 5, 2007.

(Continued)

*Primary Examiner* — Kevin Nguyen
(74) *Attorney, Agent, or Firm* — Patent Capital Group

(57) ABSTRACT

A system, method, and computer program product are provided for determining whether an electronic mail message is compliant with an etiquette policy. In use, a predetermined event associated with an electronic mail message is identified. Additionally, it is determined whether the electronic mail message is compliant with an etiquette policy, in response to the predetermined event. Furthermore, a reaction is performed, based on the determination.

26 Claims, 7 Drawing Sheets

(56) References Cited

U.S. PATENT DOCUMENTS

| | | |
|---|---|---|
| 7,100,123 B1 | 8/2006 | Todd et al. |
| 7,124,197 B2 | 10/2006 | Ocepek et al. |
| 7,149,778 B1 | 12/2006 | Patel et al. |
| 7,194,623 B1 | 3/2007 | Proudler et al. |
| 7,194,728 B1 | 3/2007 | Sirota et al. |
| 7,222,305 B2 | 5/2007 | Teplov et al. |
| 7,257,707 B2 | 8/2007 | England et al. |
| 7,278,016 B1 | 10/2007 | Detrick et al. |
| 7,313,615 B2 | 12/2007 | Fitzpatrick et al. |
| 7,346,778 B1 | 3/2008 | Guiter et al. |
| 7,350,074 B2 | 3/2008 | Gupta et al. |
| 7,350,084 B2 | 3/2008 | Abiko et al. |
| 7,383,433 B2 | 6/2008 | Yeager et al. |
| 7,424,543 B2 | 9/2008 | Rice, III |
| 7,434,543 B2 | 10/2008 | Raukola et al. |
| 7,437,752 B2 | 10/2008 | Heard et al. |
| 7,441,000 B2 | 10/2008 | Boehringer et al. |
| 7,461,249 B1 | 12/2008 | Pearson et al. |
| 7,475,420 B1 | 1/2009 | Hernacki |
| 7,484,247 B2 | 1/2009 | Rozman et al. |
| 7,490,355 B2 | 2/2009 | Wong |
| 7,497,447 B2 | 3/2009 | Musselman |
| 7,506,155 B1 | 3/2009 | Stewart et al. |
| 7,519,984 B2 | 4/2009 | Bhogal et al. |
| 7,523,484 B2 | 4/2009 | Lum et al. |
| 7,526,654 B2 | 4/2009 | Charbonneau |
| 7,539,857 B2 | 5/2009 | Bartlett et al. |
| 7,559,080 B2 | 7/2009 | Bhargavan et al. |
| 7,581,004 B2 | 8/2009 | Jakobson |
| 7,630,986 B1 | 12/2009 | Herz et al. |
| 7,653,811 B2 | 1/2010 | Yagiura |
| 7,660,845 B2 | 2/2010 | Fusari |
| 7,661,124 B2 | 2/2010 | Ramanathan et al. |
| 7,689,563 B1 | 3/2010 | Jacobson |
| 7,725,934 B2 | 5/2010 | Kumar et al. |
| 7,730,040 B2 | 6/2010 | Reasor et al. |
| 7,742,406 B1 | 6/2010 | Muppala |
| 7,847,694 B2 | 12/2010 | Lee et al. |
| 7,877,616 B2 | 1/2011 | Abiko et al. |
| 7,890,587 B1 | 2/2011 | Chebiyyam |
| 7,940,756 B1 | 5/2011 | Duffy et al. |
| 8,103,727 B2 | 1/2012 | Lin |
| 8,111,413 B2 | 2/2012 | Nuggehalli et al. |
| 8,151,363 B2 | 4/2012 | Smithson |
| 8,181,036 B1 | 5/2012 | Nachenberg |
| 8,199,965 B1 | 6/2012 | Basavapatna et al. |
| 8,272,058 B2 | 9/2012 | Brennan |
| 8,353,053 B1 | 1/2013 | Chebiyyam |
| 8,446,607 B2 | 5/2013 | Zucker et al. |
| 8,590,002 B1 | 11/2013 | Chebiyyam |
| 8,621,008 B2 | 12/2013 | Chebiyyam |
| 8,713,468 B2 | 4/2014 | Chebiyyam |
| 8,893,285 B2 | 11/2014 | Zucker et al. |
| 8,943,158 B2 | 1/2015 | Chebiyyam |
| 2001/0046069 A1 | 11/2001 | Jones |
| 2002/0046275 A1 | 4/2002 | Crosbie et al. |
| 2002/0046575 A1 | 4/2002 | Hayes et al. |
| 2002/0083003 A1 | 6/2002 | Halliday et al. |
| 2002/0099944 A1 | 7/2002 | Bowlin |
| 2002/0157089 A1 | 10/2002 | Patel et al. |
| 2003/0043039 A1 | 3/2003 | Merrem et al. |
| 2003/0046679 A1 | 3/2003 | Singleton |
| 2003/0065937 A1 | 4/2003 | Watanabe et al. |
| 2003/0097583 A1 | 5/2003 | Lacan et al. |
| 2003/0105979 A1 | 6/2003 | Itoh et al. |
| 2003/0133443 A1 | 7/2003 | Klinker et al. |
| 2003/0135744 A1 | 7/2003 | Almeida |
| 2003/0177394 A1 | 9/2003 | Dozortsev |
| 2003/0182435 A1 | 9/2003 | Redlich et al. |
| 2003/0192033 A1 | 10/2003 | Gartside et al. |
| 2003/0233421 A1 | 12/2003 | Shibata et al. |
| 2004/0003255 A1 | 1/2004 | Apvrille et al. |
| 2004/0006715 A1 | 1/2004 | Skrepetos |
| 2004/0010686 A1 | 1/2004 | Goh et al. |
| 2004/0027601 A1 | 2/2004 | Ito et al. |
| 2004/0034794 A1 | 2/2004 | Mayer et al. |
| 2004/0054928 A1 | 3/2004 | Hall |
| 2004/0064732 A1 | 4/2004 | Hall |
| 2004/0088433 A1 | 5/2004 | Kaler et al. |
| 2004/0111482 A1 | 6/2004 | Bourges-Waldegg et al. |
| 2004/0117802 A1 | 6/2004 | Green |
| 2004/0146006 A1 | 7/2004 | Jackson |
| 2004/0172557 A1 | 9/2004 | Nakae et al. |
| 2004/0199555 A1 | 10/2004 | Krachman |
| 2004/0199566 A1 | 10/2004 | Carlson et al. |
| 2004/0199596 A1 | 10/2004 | Nutkis |
| 2004/0230572 A1 | 11/2004 | Omoigui |
| 2004/0255138 A1 | 12/2004 | Nakae |
| 2005/0004359 A1 | 1/2005 | Rai et al. |
| 2005/0033810 A1 | 2/2005 | Malcolm |
| 2005/0038853 A1 | 2/2005 | Blanc et al. |
| 2005/0044359 A1 | 2/2005 | Eriksson et al. |
| 2005/0058285 A1 | 3/2005 | Stein et al. |
| 2005/0060643 A1* | 3/2005 | Glass et al. ............... 715/501.1 |
| 2005/0116749 A1 | 6/2005 | Pentakota et al. |
| 2005/0131990 A1 | 6/2005 | Jewell |
| 2005/0132184 A1 | 6/2005 | Palliyil et al. |
| 2005/0154885 A1 | 7/2005 | Viscomi et al. |
| 2005/0166066 A1 | 7/2005 | Ahuja et al. |
| 2005/0172140 A1 | 8/2005 | Ide |
| 2005/0198285 A1 | 9/2005 | Petit |
| 2005/0204009 A1 | 9/2005 | Hazarika et al. |
| 2005/0216749 A1 | 9/2005 | Brent |
| 2005/0262208 A1* | 11/2005 | Haviv et al. ............... 709/206 |
| 2005/0272861 A1 | 12/2005 | Qiao et al. |
| 2005/0275861 A1 | 12/2005 | Ferlitsch |
| 2005/0289181 A1 | 12/2005 | Deninger et al. |
| 2006/0005244 A1 | 1/2006 | Garbow et al. |
| 2006/0010150 A1 | 1/2006 | Shaath et al. |
| 2006/0010209 A1* | 1/2006 | Hodgson ............... 709/206 |
| 2006/0010217 A1 | 1/2006 | Sood |
| 2006/0021043 A1 | 1/2006 | Kaneko et al. |
| 2006/0026593 A1 | 2/2006 | Canning et al. |
| 2006/0031359 A1* | 2/2006 | Clegg et al. ............... 709/206 |
| 2006/0039554 A1 | 2/2006 | Fry |
| 2006/0041930 A1 | 2/2006 | Hafeman et al. |
| 2006/0050879 A1 | 3/2006 | Iizuka |
| 2006/0059548 A1 | 3/2006 | Hildre et al. |
| 2006/0070089 A1 | 3/2006 | Shoaib et al. |
| 2006/0075040 A1 | 4/2006 | Chmaytelli |
| 2006/0075502 A1 | 4/2006 | Edwards |
| 2006/0112166 A1 | 5/2006 | Pettigrew et al. |
| 2006/0120526 A1 | 6/2006 | Boucher et al. |
| 2006/0123413 A1 | 6/2006 | Collet et al. |
| 2006/0123479 A1 | 6/2006 | Kumar et al. |
| 2006/0132824 A1 | 6/2006 | Aritomi |
| 2006/0168026 A1 | 7/2006 | Keohane et al. |
| 2006/0190986 A1 | 8/2006 | Mont et al. |
| 2006/0224589 A1 | 10/2006 | Rowney et al. |
| 2006/0248252 A1 | 11/2006 | Kharwa |
| 2007/0022285 A1 | 1/2007 | Groth et al. |
| 2007/0028112 A1 | 2/2007 | Mackelden et al. |
| 2007/0029744 A1 | 2/2007 | Musselman |
| 2007/0033283 A1 | 2/2007 | Brown |
| 2007/0064883 A1 | 3/2007 | Rosenthal et al. |
| 2007/0074292 A1 | 3/2007 | Mimatsu |
| 2007/0094394 A1 | 4/2007 | Singh et al. |
| 2007/0101419 A1 | 5/2007 | Dawson |
| 2007/0110089 A1 | 5/2007 | Essafi et al. |
| 2007/0118904 A1 | 5/2007 | Goodman et al. |
| 2007/0136593 A1 | 6/2007 | Plavcan et al. |
| 2007/0143472 A1 | 6/2007 | Clark et al. |
| 2007/0143851 A1 | 6/2007 | Nicodemus et al. |
| 2007/0174909 A1 | 7/2007 | Burchett et al. |
| 2007/0198656 A1 | 8/2007 | Mazzaferri et al. |
| 2007/0214220 A1 | 9/2007 | Alsop et al. |
| 2007/0220319 A1 | 9/2007 | Desai et al. |
| 2007/0245148 A1 | 10/2007 | Buer |
| 2007/0256142 A1 | 11/2007 | Hartung et al. |
| 2007/0279668 A1 | 12/2007 | Czyszczewski et al. |
| 2007/0280112 A1 | 12/2007 | Zheng et al. |
| 2008/0034224 A1 | 2/2008 | Ferren et al. |
| 2008/0040358 A1 | 2/2008 | Deng |
| 2008/0065882 A1 | 3/2008 | Goodman et al. |

(56) References Cited

U.S. PATENT DOCUMENTS

| | | | |
|---|---|---|---|
| 2008/0065903 | A1 | 3/2008 | Goodman et al. |
| 2008/0079730 | A1 | 4/2008 | Zhang et al. |
| 2008/0083037 | A1 | 4/2008 | Kruse et al. |
| 2008/0120689 | A1 | 5/2008 | Morris et al. |
| 2008/0170785 | A1 | 7/2008 | Simmons et al. |
| 2008/0208988 | A1 | 8/2008 | Khouri et al. |
| 2008/0229428 | A1 | 9/2008 | Camiel |
| 2008/0262991 | A1 | 10/2008 | Kapoor et al. |
| 2008/0279381 | A1 | 11/2008 | Narendra et al. |
| 2008/0309967 | A1 | 12/2008 | Ferlitsch et al. |
| 2009/0055536 | A1 | 2/2009 | Jo |
| 2009/0086252 | A1 | 4/2009 | Zucker et al. |
| 2009/0172786 | A1 | 7/2009 | Backa |
| 2009/0182931 | A1 | 7/2009 | Gill et al. |
| 2009/0232300 | A1 | 9/2009 | Zucker et al. |
| 2009/0327743 | A1 | 12/2009 | Finlayson et al. |
| 2010/0174784 | A1 | 7/2010 | Levey et al. |
| 2010/0250547 | A1 | 9/2010 | Grefenstette et al. |
| 2011/0167265 | A1 | 7/2011 | Ahuja et al. |
| 2011/0273554 | A1 | 11/2011 | Su et al. |
| 2012/0011189 | A1 | 1/2012 | Werner et al. |
| 2012/0183174 | A1 | 7/2012 | Basavapatna et al. |
| 2012/0191792 | A1 | 7/2012 | Chebiyyam |
| 2013/0276061 | A1 | 10/2013 | Chebiyyam |
| 2014/0115086 | A1 | 4/2014 | Chebiyyam |
| 2014/0283145 | A1 | 9/2014 | Chebiyyam et al. |

OTHER PUBLICATIONS

U.S. Appl. No. 11/840,831, filed Aug. 17, 2007.
U.S. Appl. No. 12/123,370, filed May 19, 2008.
U.S. Appl. No. 12/102,526, filed Apr. 14, 2008.
U.S. Appl. No. 11/210,321, filed Aug. 23, 2005.
U.S. Appl. No. 11/473,930, filed Jun. 23, 2006.
U.S. Appl. No. 11/349,479, filed Feb. 6, 2006.
U.S. Appl. No. 11/740,844, filed Apr. 26, 2007.
U.S. Appl. No. 11/564,745, filed Nov. 29, 2006.
Fumera, G. et al., "Spam Filtering Based on the Analysis of Text Information Embedded into Images," Journal of Machine Learning Research, Dec. 2006.
Non-Final Rejection in U.S. Appl. No. 11/349,479 mailed on Dec. 8, 2008.
Response to Non-Final Action dated Dec. 8, 2008 in U.S. Appl. No. 11/349,479, filed Mar. 9, 2009.
Final Rejection in U.S. Appl. No. 11/349,479 mailed on Jun. 10, 2009.
Notice of Appeal in U.S. Appl. No. 11/349,479, filed Dec. 10, 2009.
Appeal Brief filed in U.S. Appl. No. 11/349,479, filed Dec. 10, 2009.
Examiner Interview Summary in U.S. Appl. No. 11/349,479 mailed on Feb. 5, 2010.
Non-Final Rejection in U.S. Appl. No. 11/349,479 mailed on Mar. 22, 2010.
Response to Non-Final Action dated Mar. 22, 2010 in U.S. Appl. No. 11/349,479, filed Jul. 22, 2010.
Notice of Allowance in U.S. Appl. No. 11/349,479 mailed on Nov. 8, 2010.
Non-Final Office Action in U.S. Appl. No. 11/473,930 mailed on Aug. 17, 2009.
Response to Non-Final Office Action dated Aug. 17, 2009 in U.S. Appl. No. 11/473,930, filed Nov. 17, 2009.
Non-Final Office Action in U.S. Appl. No. 11/473,930 mailed on Jan. 26, 2010.
Response to Non-Final Office Action dated Jan. 26, 2010 in U.S. Appl. No. 11/473,930, filed Apr. 26, 2010.
Non-Final Office Action in U.S. Appl. No. 11/473,930 mailed on Jul. 16, 2010.
Response to Non-Final Office Action dated Jul. 16, 2010 in U.S. Appl. No. 11/473,930, filed Dec. 16, 2010.
Non-Final Office Action in U.S. Appl. No. 11/473,930 mailed on Mar. 10, 2011.
Response to Non-Final Action dated Mar. 10, 2011 in U.S. Appl. No. 11/473,930, filed Jun. 10, 2011.
Non-Final Office Action in U.S. Appl. No. 11/546,745 mailed Nov. 2, 2009.
Response to Non-Final Office Action mailed on Nov. 2, 2009 U.S. Appl. No. 11/546,745, filed Feb. 2, 2010.
Non-Final Office Action in U.S. Appl. No. 11/546,745 mailed on Apr. 21, 2010.
Response to Non-Final Office Action mailed on Apr. 21, 2010 in U.S. Appl. No. 11/546,745, filed Jul. 21, 2010.
Final Office Action in U.S. Appl. No. 11/546,745 mailed on Oct. 21, 2010.
Request for Continued Examination and Amendment in U.S. Appl. No. 11/546,745, filed Feb. 22, 2011.
Non-Final Office Action in U.S. Appl. No. 11/740,844 mailed on May 14, 2009.
Response to Non-Final Office Action dated May 14, 2009 in U.S. Appl. No. 11/740,844, filed Oct. 14, 2009.
Final Office Action in U.S. Appl. No. 11/740,844 mailed on Jan. 11, 2010.
Response to Final Office Action dated Jan. 11, 2010 in U.S. Appl. No. 11/740,844, filed Mar. 11, 2010.
Advisory Action in U.S. Appl. No. 11/740,844 mailed on Mar. 25, 2010.
Request for Continued Examination and Amendment filed in U.S. Appl. No. 11/740,844, filed Mar. 29, 2010.
Non-Final Office Action in U.S. Appl. No. 11/740,844 mailed on Jun. 24, 2010.
Response to Non-Final Office Action dated Jun. 24, 2010 in U.S. Appl. No. 11/740,844, filed Nov. 24, 2010.
Final Office Action in U.S. Appl. No. 11/740,844 mailed on Feb. 18, 2011.
Response to Final Office Action dated Feb. 18, 2011 in U.S. Appl. No. 11/740,844, filed Apr. 18, 2011.
Advisory Action in U.S. Appl. No. 11/740,844 mailed on Apr. 27, 2011.
Request for Continued Examination and Amendment filed in U.S. Appl. No. 11/740,844, filed May 18, 2011.
Non-Final Office Action in U.S. Appl. No. 11/840,831 mailed on Oct. 12, 2010.
Response to Non-Final Action dated Oct. 12, 2010 in U.S. Appl. No. 11/840,831, filed Feb. 14, 2011.
Final Office Action in U.S. Appl. No. 11/840,831 mailed on May 5, 2011.
Request for Continued Examination and Amendment in U.S. Appl. No. 11/840,831, filed Jul. 5, 2011.
Non-Final Office Action in U.S. Appl. No. 11/905,420 mailed on May 23, 2011.
Non-Final Office Action in U.S. Appl. No. 12/076,163 mailed on Apr. 28, 2011.
ClearContext, www.clearcontext.com/user_guide/; [available online at at URL <http://web.archive.org/20061107135010/http://www.clearcontext.com/user_guide/>], Nov. 7, 2006 (pp. 1-24).
Dabbish, et al., "Understanding Email Use: Predicting Action on a Message," CHI 2005—Papers: Email and Security, Portland Oregon; available online at URL: <http://www.cs.cmu.edu/~kraut/Rkraut.site.files/articles/dabbish05-UnderstandingEmailUse.pdf>] Apr. 2-7, 2005 (pp. 691-700).
Non-Final Office Action in U.S. Appl. No. 11/740,844 mailed on Jul. 20, 2011.
Non-Final Office Action in U.S. Appl. No. 11/840,831 mailed on Jul. 21, 2011.
Response to Non-Final Office Action dated Apr. 28, 2011 in U.S. Appl. No. 12/076,163, filed Jul. 28, 2011.
Final Office Action in U.S. Appl. No. 11/840,831 mailed on Dec. 21, 2011.
Request for Continued Examination and Amendment in U.S. Appl. No. 11/905,420 filed Jan. 3, 2012.
Non-Final Office Action in U.S. Appl. No. 11/564,745 mailed on Jan. 19, 2012.
Request for Continued Examination and Amendment in U.S. Appl. No. 12/076,163 filed Jan. 19, 2012.

(56) References Cited

OTHER PUBLICATIONS

Final Office Action in U.S. Appl. No. 11/740,844 mailed on Feb. 16, 2012.
Request for Continued Examination and Response in U.S. Appl. No. 11/840,831, filed Feb. 21, 2012.
Non-Final Office Action in U.S. Appl. No. 11/473,930 mailed on Mar. 1, 2012.
Request for Continued Examination in U.S. Appl. No. 11/840,831, filed Mar. 22, 2012.
U.S. Appl. No. 13/429,363 entitled "System, Method, and Computer Program Product for Preventing Image-Related Data Loss", filed on Mar. 24, 2012.
Notice of Allowance in U.S. Appl. No. 11/840,831 mailed on Apr. 3, 2012.
U.S. Appl. No. 13/434,777, filed Mar. 29, 2012, entitled "System, Method, and Computer Program Product for Determining Whether an Electronic Mail Message is Compliant with an Etiquette Policy", Inventor Gopi Krishna Chebiyyam.
Response to Non-Final Office Action dated Jan. 19, 2012 in U.S. Appl. No. 11/564,745, filed Apr. 16, 2012.
Request for Continued Examination and Amendment in U.S. Appl. No. 11/740,844, filed Apr. 16, 2012.
Request for Continued Examination in U.S. Appl. No. 11/840,831, filed Apr. 27, 2012.
Final Office Action in U.S. Appl. No. 11/564,745 mailed on Jun. 4, 2012.
Non-Final Office Action in U.S. Appl. No. 11/740,844 mailed on May 10, 2012.
Response to Non-Final Office Action dated May 10, 2012 in U.S. Appl. No. 11/740,844, filed Jul. 10, 2012.
Non-Final Office Action in U.S. Appl. No. 11/905,420 mailed on Jul. 23, 2011.
Response to Non-Final Action dated May 23, 2011 in U.S. Appl. No. 11/905,420, filed Aug. 22, 2011.
Final Office Action in U.S. Appl. No. 11/473,930 mailed on Sep. 14, 2011.
Response to Non-Final Office Action dated Jul. 20, 2011 in U.S. Appl. No. 11/740,844, filed Oct. 19, 2011.
Response to Non-Final Action dated Jul. 21, 2011 in U.S. Appl. No. 11/840,831, filed Oct. 19, 2011.
Final Office Action in U.S. Appl. No. 11/905,420 mailed on Nov. 2, 2011.
Final Office Action in U.S. Appl. No. 12/076,163 mailed on Oct. 19, 2011.
Request for Continued Examination and Amendment in U.S. Appl. No. 11/473,930, filed Nov. 14, 2011.
Notice of Allowance in U.S. Appl. No. 11/840,831 mailed on Mar. 16, 2012.
Layland, Robin, "Data Leak Prevention: Coming Soon to a Business Near You," Business Communications Review, May 2007 (pp. 44-49).
Heikkila, Faith M., "Encryption: Security Considerations for Portable Media Devices," IEEE Computer Society, IEEE Security & Privacy, Jul.-Aug. 2007 (pp. 22-27).
Response to Non-Final Office Action dated Mar. 1, 2012 in U.S. Appl. No. 11/473,930, filed May 29, 2012.
Final Office Action in U.S. Appl. No. 11/473,930 mailed on Aug. 8, 2012.
Request for Continued Examination and Amendment to in U.S. Appl. No. 11/473,930, filed Nov. 7, 2012.
Request for Continued Examination and Amendment in U.S. Appl. No. 11/564,745, filed Aug. 6, 2012.
Final Office Action in U.S. Appl. No. 11/740,844 mailed on Aug. 15, 2012.
Request for Continued Examination and Amendment in U.S. Appl. No. 11/740,844, filed Nov. 15, 2012.
Response to Non-Final Office Action dated Jul. 23, 2012 in U.S. Appl. No. 11/905,420, filed Oct. 23, 2012.
Notice of Allowance in U.S. Appl. No. 11/840,831 mailed on May 9, 2012.
Notice of Allowance in U.S. Appl. No. 11/905,420 mailed on Dec. 6, 2012.
Non-Final Office Action in U.S. Appl. No. 12/076,163 mailed on Sep. 4, 2012.
Response to Non-Final Office Action dated Sep. 4, 2012 in U.S. Appl. No. 12/076,163, filed Dec. 4, 2012.
Non-Final Office Action in U.S. Appl. No. 13/434,777 mailed on Aug. 20, 2012.
Response to Non-Final Office Action dated Aug. 20, 2012 in U.S. Appl. No. 13/434,777, filed Nov. 20, 2012.
Response to Non-Final Office Action dated Feb. 4, 2013 in U.S. Appl. No. 11/473,930, filed May 06, 2013.
Non-Final Office Action in U.S. Appl. No. 11/564,745 mailed on Apr. 5, 2013.
Non-Final Office Action in U.S. Appl. No. 11/740,844 mailed on May 3, 2013.
Final Office Action in U.S. Appl. No. 12/076,163 mailed on Mar. 25, 2013.
Request for Continued Examination and Amendment in U.S. Appl. No. 13/434,777, filed Apr. 15, 2013.
Non-Final Office Action in U.S. Appl. No. 11/473,930 mailed on Feb. 4, 2013.
Final Office Action in U.S. Appl. No. 13/434,777 mailed on Feb. 12, 2013.
Final Office Action in U.S. Appl. No. 11/473,930 mailed on Jul. 16, 2013.
Response to Non-Final Office Action dated Apr. 05, 2013 in U.S. Appl. No. 11/564,745, filed Jul. 5, 2013.
Notice of Allowance in U.S. Appl. No. 11/564,745 mailed on Jul. 29, 2013.
Response to Non-Final Office Action dated May 3, 2013 in U.S. Appl. No. 11/740,844, filed Aug. 5, 2013.
Notice of Allowance in U.S. Appl. No. 11/740,844 mailed on Sep. 5, 2013.
Non-Final Office Action in U.S. Appl. No. 12/076,163 mailed on Sep. 10, 2013.
Response to Non-Final Office Action dated May 23, 2013 in U.S. Appl. No. 13/434,777, filed Aug. 23, 2013.
Masaru Takesue, "A Scheme for Protecting the Information Leakage Via Portable Devices," IEEE, 2007.
Hangbae Chang et al., "Design of Inside Information Leakage Prevention System in Ubiquitous Computing Environment," Springer Verlag, 2005.
Mingdi Xu et al., "A New Data Protecting Scheme Based on TPM," IEEE, 2007.
Peter Hannay et al.," Pockdet SDV with SD Guardian: A Secure & Forensically Safe Portable Execution Environment," Australian Digital Forensics Conference, 2007.
Morejon, Mario, "Review: Remote Desktop Support out of the Box", CRN Tech, May 21, 2007.
Notice of Allowance in U.S. Appl. No. 11/349,479 mailed on Oct. 7, 2010.
U.S. Appl. No. 14/144,136 entitled "System, Method, and Computer Program Product for Performing an Action Based on an Aspect of an Electronic Mail Message Thread", inventor Gopi Krishna Chebiyyam, filed on Dec. 30, 2013.
Non-Final Office Action in U.S. Appl. No. 14/144,136 mailed on Jun. 2, 2014.
Non-Final Office Action in U.S. Appl. No. 13/429,363 mailed on Sep. 23, 2013.
Final Office Action in U.S. Appl. No. 13/429,363 mailed on Mar. 21, 2014.
Final Office Action in U.S. Appl. No. 12/076,163 mailed on Mar. 18, 2014.
Notice of Allowance in U.S. Appl. No. 13/434,777 mailed on Dec. 17, 2013.
Non-Final Office Action in U.S. Appl. No. 11/850,432 mailed on Oct. 7, 2010.
Final Office Action in U.S. Appl. No. 11/850,432 mailed on May 10, 2011.
Non-Final Office Action in U.S. Appl. No. 11/850,432 mailed on Jul. 16, 2013.

(56) References Cited

OTHER PUBLICATIONS

Final Office Action in U.S. Appl. No. 11/850,432 mailed on Jan. 31, 2014.
Advisory Action in U.S. Appl. No. 12/102,526 mailed on Aug. 1, 2011.
Non-Final Office Action in U.S. Appl. No. 12/102,526 mailed on Feb. 6, 2012.
Notice of Allowance in U.S. Appl. No. 12/102,526 mailed on Sep. 21, 2012.
Request for Continued Examination and Amendment in U.S. Patent Application Serial No. 12/076,163, filed May 28, 2013.
Non-Final Office Action in U.S. Appl. No. 13/434,777 mailed on May 23, 2013.
U.S. Appl. No. 12/102,526, filed on Apr. 14, 2008, entitled "Computer Program Product and Method for Permanently Storing Data Based on Whether a Device is Protected with an Encryption Mechanism and Whether Data in a Data Structure Requires Encryption", Inventor Gopi Krishna Chebiyyam.
Non-Final Office Action in U.S. Appl. No. 12/102,526 mailed on Nov. 24, 2010.
Response to Non-Final Office Action dated Nov. 24, 2010 in U.S. Appl. No. 12/102,526, filed Mar. 9, 2011.
Final Office Action in U.S. Appl. No. 12/102,526 mailed on May 25, 2011.
After Final Response to Final Office Action dated May 25, 2011 in U.S. Appl. No. 12/105,526, filed Jul. 13, 2011.
Advisory Action in U.S. Appl. No. 12/105,526 mailed on Aug. 1, 2011.
Request for Continued Examination in U.S. Appl. No. 12/105,526, filed Aug. 25, 2011.
Notice of Allowance in U.S. Appl. No. 12/105,526 mailed on Sep. 21, 2013.
U.S. Appl. No. 14/606,915, filed Jan. 27, 2015, entitled System, Method and Computer Program Product for Performing an Action Based on an Aspect of an Electronic Mail Message Thread, Inventor Gopi Krishna Chebiyyam.
Final Office Action in U.S. Appl. No. 13/429,363 mailed on Jan. 27, 2015.
Non-Final Office Action in U.S. Appl. No. 14/289,859 mailed on Mar. 13, 2015.
Non-Final Office Action in U.S. Appl. No. 13/429,363 mailed on Jul. 30, 2014.
Notice of Allowance in U.S. Appl. No. 12/076,163 mailed on Jul. 18, 2014.
U.S. Appl. No. 14/543,869, filed Nov. 17, 2014 and entitled Securing Data Using Integrated Host-Based Data Loss Agent With Encryption Detection, inventors Elad Zucker et al.

* cited by examiner

SYSTEM, METHOD, AND COMPUTER PROGRAM PRODUCT FOR DETERMINING WHETHER AN ELECTRONIC MAIL MESSAGE IS COMPLIANT WITH AN ETIQUETTE POLICY

FIELD OF THE INVENTION

The present invention relates to processing electronic mail messages, and more particularly to policy-based electronic mail message processing.

BACKGROUND

Electronic mail messages have conventionally been utilized for communicating data over a network. Such electronic mail messages have oftentimes been processed based on policies, for ensuring the electronic mail messages comply with such policies. However, traditional policy-based electronic mail message processing has exhibited various limitations. Just by way of example, electronic mail messages have generally been limited to being processed based on security policies for ensuring security with respect to the electronic mail messages.

There is thus a need for addressing these and/or other issues associated with the prior art.

SUMMARY

A system, method, and computer program product are provided for determining whether an electronic mail message is compliant with an etiquette policy. In use, a predetermined event associated with an electronic mail message is identified. Additionally, it is determined whether the electronic mail message is compliant with an etiquette policy, in response to the predetermined event. Furthermore, a reaction is performed, based on the determination.

DETAILED DESCRIPTION

Figure 1:
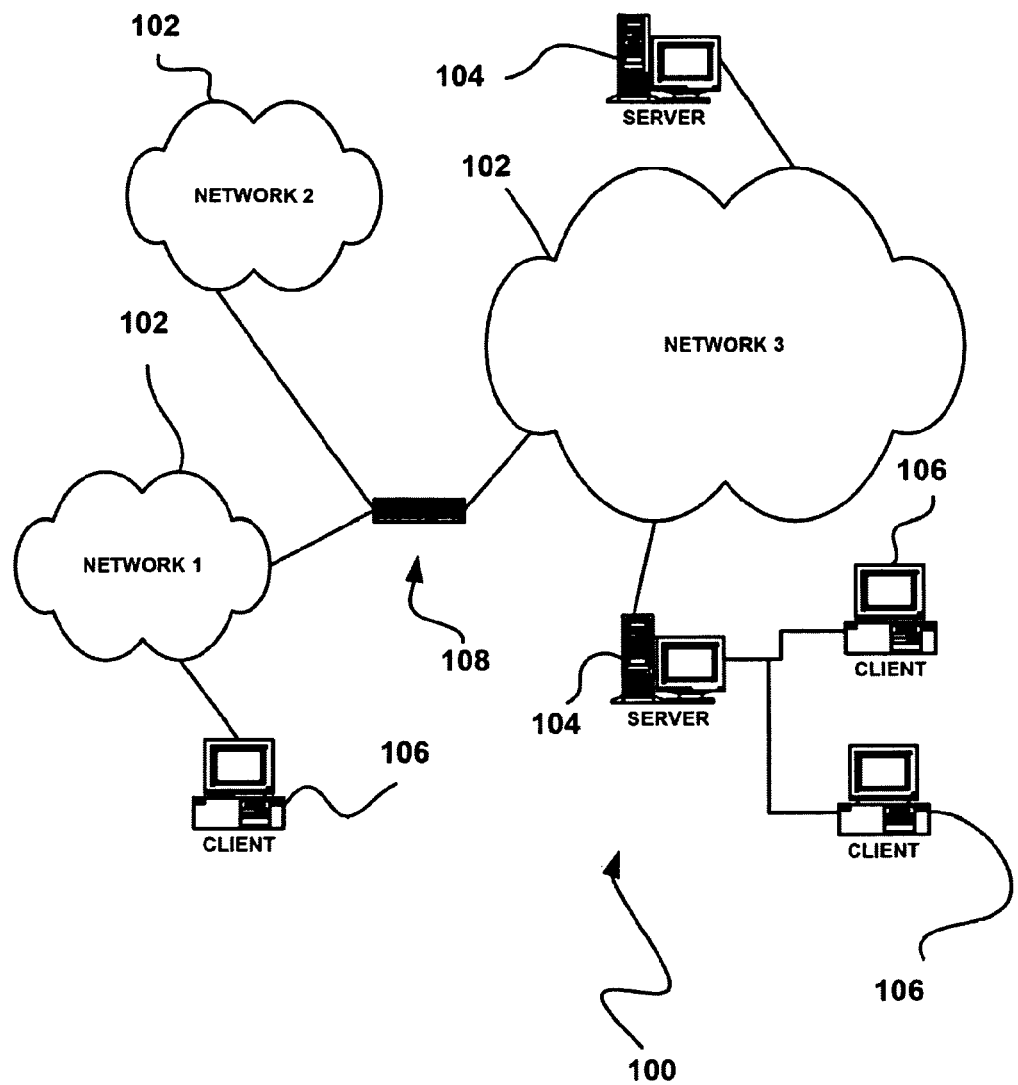
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
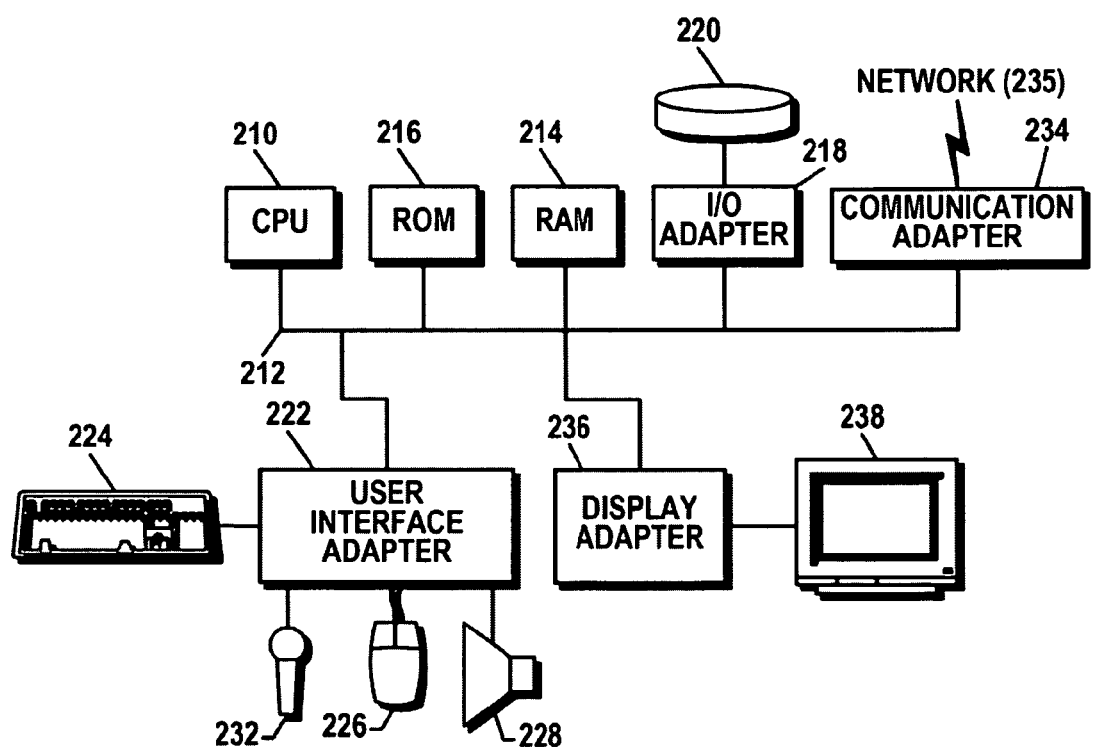
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
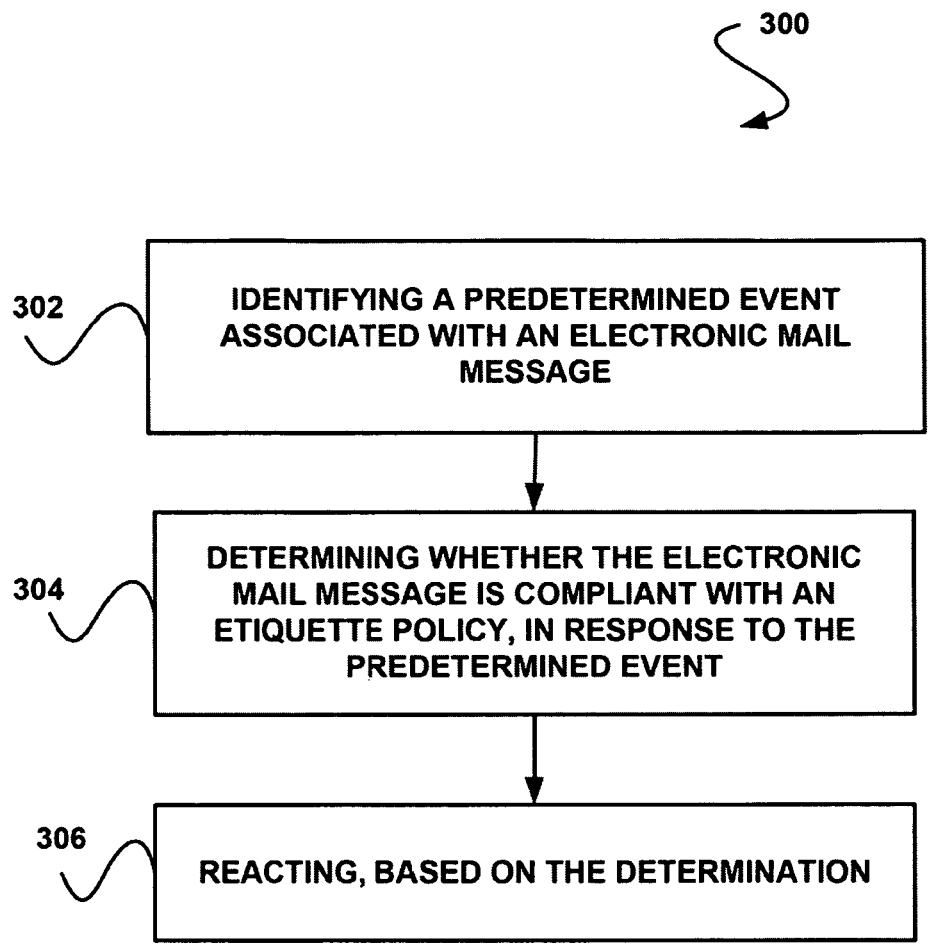
FIG. 3 shows a method for determining whether an electronic mail message is compliant with an etiquette policy, in accordance with one embodiment.

FIG. 3 shows a method 300 for determining whether an electronic mail message is compliant with an etiquette policy, in accordance with one embodiment. As an option, the method 300 may be carried out in the context of the architecture and environment of FIGS. 1 and/or 2. Of course, however, the method 300 may be carried out in any desired environment.

As shown in operation 302, a predetermined event associated with an electronic mail (email) message is identified. With respect to the present description, the email message may include any mail message capable of being electronically communicated. For example, the email message may be capable of being communicated over a network utilizing an email messaging application (e.g. Microsoft® Outlook®, etc.).

Further, the predetermined event associated with the email message may include a request, command, etc. Such request, command, etc. may be received from a user of a client device utilized to generate, view, etc. the email message. As another option, the request, command, etc. may be received from an administrator, such as an administrator (e.g. of a server device via which the email message is communicated from a first client device to a second client device, etc.).

For example, in one embodiment, the predetermined event associated with the email message may include a request, command, etc. to send the email message (e.g. over the network to a designated recipient). As an option, the request, command, etc. to send the email message may include a user selection of an option to send the email message. The user selection may be performed utilizing the email messaging application, for example.

In another embodiment, the predetermined event associated with the email message may include a request, command, etc. to determine whether the email message is compliant with an etiquette policy. For example, the request, command, etc. may include a user selection of an option to determine whether the email message is compliant with an etiquette policy (e.g. where such etiquette policy is associated with a minimum threshold for etiquette of the email message). Such option may include a button included in a graphical user interface (GUI), just by way of example.

The option may be selected during composition of the email message, and thus while a window displaying contents of the email message is displayed. In another embodiment, the option may be selected after composition of the email message, and thus without contents of the email message being displayed. For example, the option may be selected with respect to a previously drafted (e.g. and not yet sent) email message, such as an email message stored in a drafts folder of the email messaging application.

To this end, indicia may be displayed, such that the predetermined event may include selection of the indicia (e.g. by a user). In various embodiments, the indicia may include a send icon, a check icon (e.g. for initiating the determination of whether the email message is compliant with an etiquette policy), etc., as noted above. In this way, the predetermined event may optionally be manually generated. For example, the predetermined event may include an on-demand event.

Of course, as another option, the predetermined event may be automatically generated. Just by way of example, in one embodiment, the predetermined event may include receipt of the email message over a network. As an option, the predetermined event may include receipt of the email message at a client device to which the email message is destined. As another option, the predetermined event may include receipt of the email message at a server device, such as a server device utilized for communicating the email message from a first client device to a second client device.

While various embodiments of the predetermined event have been described above, it should be noted that the predetermined event may include any type of event predetermined for the email message. Moreover, in various embodiments, the predetermined event may be identified by a client device capable of being utilized to send the email message, a client device that received the email message, a server device that received the email message, etc. For example, the predetermined event may be identified by an agent, plug-in, and/or any other application installed on any of such devices.

In addition, as shown in operation 304, it is determined whether the email message is compliant with an etiquette policy, in response to the predetermined event. Accordingly, in response to the identification of the predetermined event, it may be determined whether the email message is compliant with the etiquette policy. To this end, the determination may optionally be carried out at any of the client devices and/or the server device described above. Just by way of example, the determination may be carried out utilizing an application situated on any of such devices.

With respect to the present description, the etiquette policy may include any policy capable of being utilized for determining whether etiquette of the email message is compliant with a predefined etiquette. For example, the policy may include rules indicating the predefined etiquette. In this way, portions (e.g. a body, attachment, header, etc.) of the email message may be compared with the etiquette policy (e.g. with rules of the etiquette policy) for determining whether the email message is compliant with the etiquette policy.

In one embodiment, the etiquette policy may relate to a size of the email message. For example, the etiquette policy may include a rule indicating that the email message is not allowed to exceed a predefined threshold size (e.g. 1 megabyte, etc.). Thus, a size of the email message may be compared to the size indicated by the etiquette policy for determining whether the email message is compliant with the etiquette policy. In this way, it may optionally be determined that the email message is not compliant with the etiquette policy if the size of the email message exceeds the size indicated by the etiquette policy.

In another embodiment, the etiquette policy may relate to a format of the email message (e.g. a format of content of the email message). For example, the etiquette policy may include a rule indicating that the email message is not allowed to, or is optionally only allowed to, include at least one predefined format. As another example, the etiquette policy may include a rule indicating that the email message is not allowed to, or is optionally only allowed to, include at least one predefined format based on a recipient of the email message. The format may include plain text, hypertext markup language (HTML), rich text format (RTF), etc. To this end, a format of the email message may be compared to the format indicated by the etiquette policy for determining whether the email message is compliant with the etiquette policy. Accordingly, it may optionally be determined that the email message is not compliant with the etiquette policy if the format of the email message does not comply with the format indicated by the etiquette policy.

In yet another embodiment, the etiquette policy may relate to a disclaimer included in the email message. As an option, the etiquette policy may include a rule indicating that the email message is required to include a disclaimer. As another option, the etiquette policy may include a rule indicating that the email message is required to include a predefined disclaimer, a disclaimer with a predefined format, etc. Thus, it may optionally be determined that the email message is not compliant with the etiquette policy if the email message does not include a disclaimer as indicated by the etiquette policy.

In still yet another embodiment, the etiquette policy may relate to a signature (e.g. digital signature, etc.) of the email message. For example, the etiquette policy may include a rule indicating that the email message is required to include a signature. As another option, the etiquette policy may include a rule indicating that the email message is required to include a predefined signature, a signature with a predefined format, etc. Thus, it may optionally be determined that the email message is not compliant with the etiquette policy if the email message does not include a signature as indicated by the etiquette policy.

In another embodiment, the etiquette policy may relate to a font of the email message (e.g. a font of text included in the email message). Just by way of example, the etiquette policy may include a rule indicating that the email message is not allowed to, or is optionally only allowed to, include at least one predefined font type, font size, etc. Accordingly, a font of text included in the email message may be compared to the font indicated by the etiquette policy for determining whether the email message is compliant with the etiquette policy. It may optionally be determined that the email message is not compliant with the etiquette policy if the font of text included in the email message does not comply with the font indicated by the etiquette policy.

In yet another embodiment, the etiquette policy may relate to a number of recipients of the email message. For example, the etiquette policy may include a rule indicating that the email message is not allowed to be sent to more than a predefined threshold number of recipients (e.g. 10 recipients, etc.). Thus, a number of recipients of the email message (e.g. as designated by a header of the email message, etc.) may be compared to the threshold number of recipients indicated by the etiquette policy for determining whether the email message is compliant with the etiquette policy. In this way, it may optionally be determined that the email message is not compliant with the etiquette policy if the number of recipients of the email message exceeds the threshold number of recipients indicated by the etiquette policy.

In still yet another embodiment, the etiquette policy may relate to a distribution list (e.g. collection of recipients) utilized by the email message. As an option, the etiquette policy may include a rule indicating that the email message is not allowed to be addressed to more than a predefined number of distribution lists. A number of distribution lists utilized by the email message (e.g. as designated by a header of the email message, etc.) may optionally be compared to the predefined number of distribution lists indicated by the etiquette policy for determining whether the email message is compliant with the etiquette policy. As another option, it may be determined that the email message is not compliant with the etiquette policy if the number of distribution lists utilized by the email message exceeds the predefined number of distribution lists indicated by the etiquette policy.

In another embodiment, the etiquette policy may relate to a number of attachments and/or a type of attachment of the email message (e.g. included in the email message). For example, the etiquette policy may include a rule indicating that the email message is not allowed to include more than a predefined number of attachments (e.g. 5 attachments, etc.), such that it may be determined that the email message is not compliant with the etiquette policy if the number of attachments of the email message exceeds the predefined number of attachments indicated by the etiquette policy. As another example, the etiquette policy may include a rule indicating that the email message is not allowed to include, or is optionally only allowed to include, a predefined type of attachment (e.g. an executable attachment, etc.), such that it may be determined that the email message is not compliant with the etiquette policy if the type of attachment of the email message is not compliant with the type of attachment indicated by the etiquette policy. In another embodiment, the etiquette policy may relate to whether multiple attachments of the email message are compressed as a zip file.

It should be noted that while various etiquette of the etiquette policy has been described above, such etiquette and/or any other etiquette may be included in the etiquette policy in combination, etc. Just by way of example, the etiquette policy may include a rule indicating that the email message is only allowed to have a predefined format and a predefined recipient. Of course, the etiquette policy may be configured as desired (e.g. by an administrator, etc.).

Moreover, a reaction is performed, based on the determination, as shown in operation 306. The reaction may optionally include any number of actions, such as a single action, a combination of actions, etc. Such actions may include the reactions described below, for example.

For example, if it is determined that the email message is compliant with the etiquette policy, a first reaction may be performed. In one embodiment, the reaction may include categorizing (e.g. flagging, etc.) the email message as compliant, if it is determined that the email message is compliant with the etiquette policy. In another embodiment, the reaction may include allowing the email message to be transmitted (e.g. to recipients designated by the email message), if it is determined that the email message is compliant with the etiquette policy. In yet another embodiment, the reaction may include reporting the compliance of the email message (e.g. the report created based on an event and/or data generated in response to the compliance of the email message), if it is determined that the email message is compliant with the etiquette policy.

In yet another embodiment the reaction may include logging a result of the determination of whether the email message is compliant (e.g. a compliance of the email message) if it is determined that the email message is compliant with the etiquette policy. In still yet another embodiment, the reaction may include sending an event and/or any other data indicative of the email message, a result of the determination of whether the email message is compliant (e.g. indicative of a compliance of the email message), etc. to a management server, if it is determined that the email message is compliant with the etiquette policy.

As another example, if it is determined that the email message is not compliant with the etiquette policy, a second reaction that is different from the first reaction may be performed. In one embodiment, the reaction may include preventing the email message from being transmitted (e.g. to recipients designated by the email message), if it is determined that the email message is not compliant with the etiquette policy. Just by way of example, the email message may be quarantined, deleted, etc., if it is determined that the email message is not compliant with the etiquette policy.

In another embodiment, the reaction may include categorizing the electronic at non-compliant, if it is determined that the email message is not compliant with the etiquette policy. In yet another embodiment, the reaction may include reporting the email message (e.g. the report created based on an event and/or data generated in response to the non-compliance of the email message), if it is determined that the email message is not compliant with the etiquette policy. For example, an information technology (IT) department of an organization that is a source or recipient of the email message may be notified, an administrator (e.g. IT administrator) may notified, a manager (e.g. senior management) may be notified, etc.

In still yet another embodiment, the reaction may include sending an event and/or any other data indicative of the email message, a result of the determination of whether the email message is compliant (e.g. indicative of a non-compliance of the email message), etc. to a management server, if it is determined that the email message is not compliant with the etiquette policy. In another embodiment, the reaction may include logging the email message, a result of the determination of whether the email message is compliant (e.g. a non-compliance of the email message), etc., if it is determined that the email message is not compliant with the etiquette policy.

To this end, it may optionally be ensured that the email message is only transmitted if such email message complies with an etiquette policy. Ensuring such compliance may further ensure that a reputation of a sender of the email message, an organization employing the sender, etc. is maintained at a desired level (e.g. by preventing transmittal of non-compliant email messages based on which a recipient may judge a reputation of the sender, organization, etc.), in various embodiments.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4A:
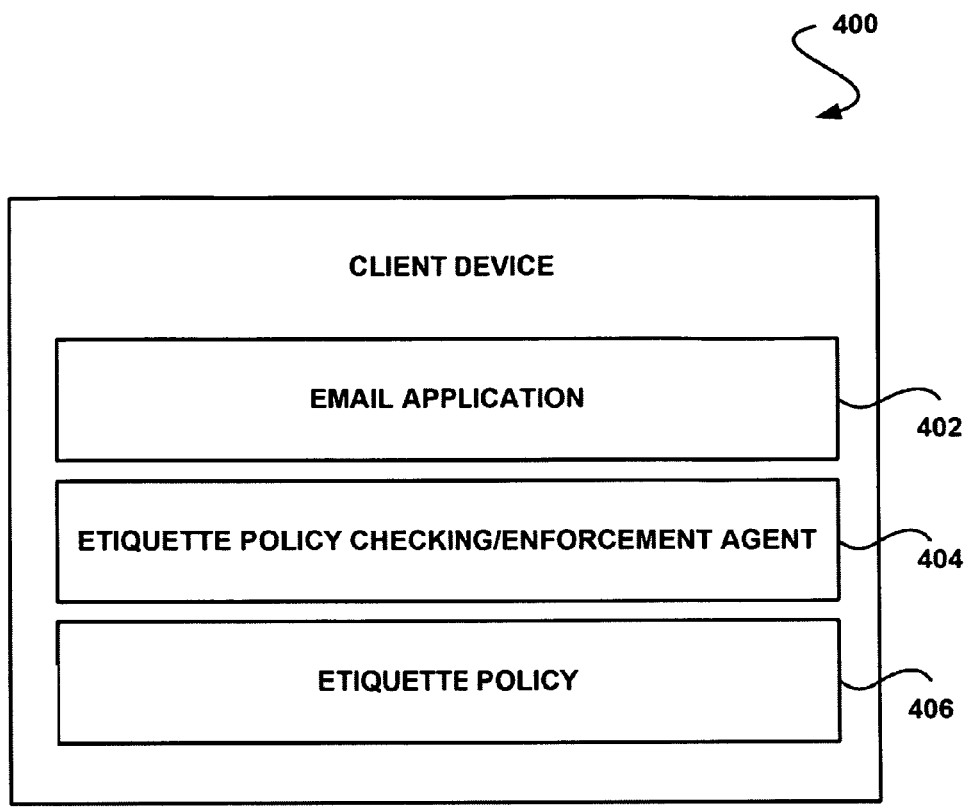
FIG. 4A shows a client-side system for determining whether an electronic mail message is compliant with an etiquette policy, in accordance with another embodiment.

FIG. 4A shows a client-side system 400 for determining whether an electronic mail message is compliant with an etiquette policy, in accordance with another embodiment. As an option, the client-side system 400 may be implemented in the context of the architecture and environment of FIGS. 1-3. Of course, however, the client-side system 400 may be implemented in any desired environment. It should also be noted that the aforementioned definitions may apply during the present description.

As shown, the client-side system 400 includes a client device (hereinafter referred to as the client device 400). The client device 400 may include any client device capable of determining whether an email message is compliant with an etiquette policy 406, and reacting based on such determination. For example, the client device 400 may include a device utilized by a user to compose the email message, send the email message to a recipient device (e.g. over a network), etc. For example, the client device 400 may include a sending mail client or a receiving mail client. As an option, the client device 400 may include any of the client devices described above with respect to FIGS. 1 and/or 2.

In addition, the client device 400 includes an email application 402. The email application 402 may include any program, code, etc. that may be utilized for managing the email message. In various embodiments, the email application 402 may be used for composing the email message, sending the email message to a recipient device, receiving the email message, etc.

Further, the client device 400 includes an etiquette policy checking and enforcement agent 404 (hereinafter referred to as the agent 404). With respect to the present embodiment, the agent 404 may include a module (e.g. computer code) for determining whether an email message is compliant with the etiquette policy 406, and reacting based on such determination.

In one embodiment, the agent 404 may identify a predetermined event associated with the email message. For example, the agent 404 may identify receipt of the email message. As another example, the agent 404 may identify user selection of an option to send the email message to a recipient. As yet another example, the agent 404 may identify user selection of an option to determine whether the email message is compliant with the etiquette policy 406. For example, the user may select the option for a selected plurality of email messages, such that the selected email messages are subject to the determination and any reaction based on the determination.

Such predetermined event may optionally be identified based on monitoring performed by the agent 404 for the predetermined event. As another option, the predetermined event may be identified in response to a notification received from the email application 402 indicating occurrence of the predetermined event.

In another embodiment, the agent 404 may determine whether the email message is compliant with the etiquette policy 406, in response to the predetermined event. For example, the agent 404 may compare characteristics of the email message to the etiquette policy 406 for determining whether the email message is compliant with the etiquette policy 406. The characteristics of the email message may include a size of the email message, a format of the email message, a disclaimer associated with the email message, etc.

As an option, the etiquette policy 406 may be included in a set of etiquette policies. Thus, the agent 404 may determine whether the email message is compliant with each etiquette policy in the set of etiquette policies. As another option, the etiquette policy 406 may be locally stored on the client device 400. As yet another option, the etiquette policy 406, and optionally any updates thereto, may be received by the client device 400 from a centralized and/or distributed server, such as an etiquette policy management server, over a network. Of course, however, the etiquette policy 406 may be received by the client device 400 in any desired manner.

In yet another embodiment, the agent 404 may react, based on the determination of whether the email message is compliant with the etiquette policy 406. For example, if the agent 404 determines that the email message is compliant with the etiquette policy 406, the agent 404 may allow the email message to be sent a recipient designated by the email message. As another example, the agent 404 may report the compliance of the email message to a user of the client device 400, an administrator of a remote server device (not shown), etc.

Just by way of example, if the predetermined event includes a user selection of an option to send the email message, the agent 404 may allow the email message to be sent in response to a determination by the agent 404 that the email message is compliant with the etiquette policy 406. As another example, if the predetermined event includes a user selection of an option to determine whether the email message is compliant with the etiquette policy 406, the agent 404 may report the compliance of the email message to the user in response to a determination by the agent 404 that the email message is compliant with the etiquette policy 406.

However, if the agent 404 determines that the email message is not compliant with the etiquette policy 406, the agent 404 may prevent sending of the email message. As another option, the agent 404 may report the non-compliance of the email message to a user of the client device 400, an administrator of a remote server device (not shown), etc. For example, if the predetermined event includes a user selection of an option to send the email message, the agent 404 may prevent the email message from being sent in response to a determination by the agent 404 that the email message is not compliant with the etiquette policy 406. As another example, if the predetermined event includes a user selection of an option to determine whether the email message is compliant with the etiquette policy 406, the agent 404 may report the non-compliance of the email message to the user in response to a determination by the agent 404 that the email message is not compliant with the etiquette policy 406.

Figure 4B:
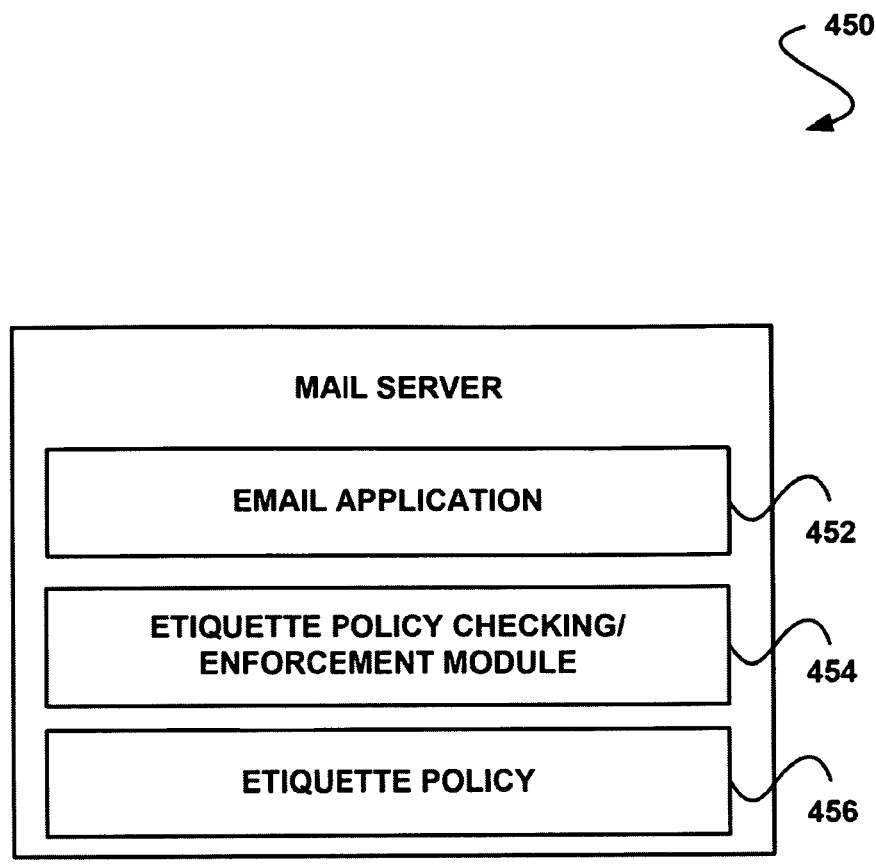
FIG. 4B shows a server-side system for determining whether an electronic mail message is compliant with an etiquette policy, in accordance with yet another embodiment.

FIG. 4B shows a server-side system 450 for determining whether an electronic mail message is compliant with an etiquette policy, in accordance with yet another embodiment. As an option, the server-side system 450 may be implemented in the context of the architecture and environment of FIGS. 1-3. Of course, however, the server-side system 450 may be implemented in any desired environment. It should also be noted that the aforementioned definitions may apply during the present description.

As shown, the server-side system 450 includes a serve device (hereinafter referred to as the server device 450). The server device 450 may include any server device capable of determining whether an email message is compliant with an etiquette policy 456, and reacting based on such determination. For example, the server device 450 may include a device utilized to send the email message from a first client device to a second client device designated by the email message, etc. As another example, the server device 450 (e.g. mail server) may include either a sending mail server or a receiving mail server. If the email message is sent across different organizations (e.g. networks, etc.), there may be multiple mail servers involved in the email message transmission/reception. As an option, the server device 450 may include any of the server devices described above with respect to FIGS. 1 and/or 2.

In addition, the server device 450 includes an email application 452. The email application 452 may include any program, code, etc. that may be utilized for managing the email message. In various embodiments, the email application 452 may be used for sending the email message to a recipient device, receiving the email message from a client device, storing the email message, etc. As an option, the email application 452 may manage (e.g. store, etc.) email messages associated with a plurality of email messaging applications of various client devices (e.g. such as the client device 400 of FIG. 4).

Further, the server device 450 includes an etiquette policy checking and enforcement module 454 (hereinafter referred to as the module 454). With respect to the present embodiment, the module 454 may include computer code, a plug-in, a component, etc. for determining whether an email message is compliant with the etiquette policy 456, and reacting based on such determination.

In one embodiment, the module 454 may identify a predetermined event associated with the email message. For example, the module 454 may identify receipt of the email message. As another example, the module 454 may identified a user (e.g. administrator) selection of an option to determine whether the email message is compliant with the etiquette policy 456. For example, the user may select the option for email messages received within a designated period of time (e.g. a particular month, day, etc.), for emails received with respect to designated email applications of at least one client device (e.g. emails communicated to the client device via the server device 450, emails communicated from the client device via the server device 450), etc. In this way, the user may optionally be allowed to select a plurality of emails for being subject to the determination of whether such emails comply with the etiquette policy 456, and thus subject to a reaction based on the determination.

Such predetermined event may optionally be identified based on monitoring performed by the module 454 for the predetermined event. As another option, the predetermined event may be identified in response to a notification received from the email application 452 indicating occurrence of the predetermined event.

In another embodiment, the module 454 may determine whether the email message is compliant with the etiquette policy 456, in response to the predetermined event. For example, the module 454 may compare characteristics of the email message to the etiquette policy 456 for determining whether the email message is compliant with the etiquette policy 456. The characteristics of the email message may include a size of the email message, a format of the email message, a disclaimer associated with the email message, etc.

As an option, the etiquette policy 456 may be included in a set of etiquette policies. Thus, the module 454 may determine whether the email message is compliant with each etiquette policy in the set of etiquette policies. As another option, the etiquette policy 456 may be locally stored on the server device 450. As yet another option, the etiquette policy 456 may be received by the server device 450 from a centralized and/or distributed server, such as an etiquette policy management server, over a network. As yet another option, the etiquette policy 456 may be configured at the server device 450. For example, the server device 450 may be utilized for distributing the etiquette policy 456 to a plurality of other devices (e.g. such as the client device 400 of FIG. 4).

In yet another embodiment, the module 454 may react, based on the determination of whether the email message is compliant with the etiquette policy 456. For example, if the module 454 determines that the email message is compliant with the etiquette policy 456, the module 454 may allow the email message to be sent a recipient designated by the email message. As another example, the module 454 may report the compliance of the email message to an administrator associated with the server device 450, a client device from which the email message was received (not shown), etc.

Just by way of example, if the predetermined event includes a user selection of an option to determine whether the email message is compliant with the etiquette policy 456, the module 454 may report the compliance of the email message to the user in response to a determination by the module 454 that the email message is compliant with the etiquette policy 456.

However, if the module 454 determines that the email message is not compliant with the etiquette policy 456, the module 454 may prevent sending of the email message. As another option, the module 454 may report the non-compliance of the email message to an administrator associated with the server device 450, a client device from which the email message was received (not shown), etc. For example, if the predetermined event includes a user selection of an option to determine whether the email message is compliant with the etiquette policy 456, the module 454 may report the non-compliance of the email message to the user in response to a determination by the module 454 that the email message is not compliant with the etiquette policy 456.

Figure 5:
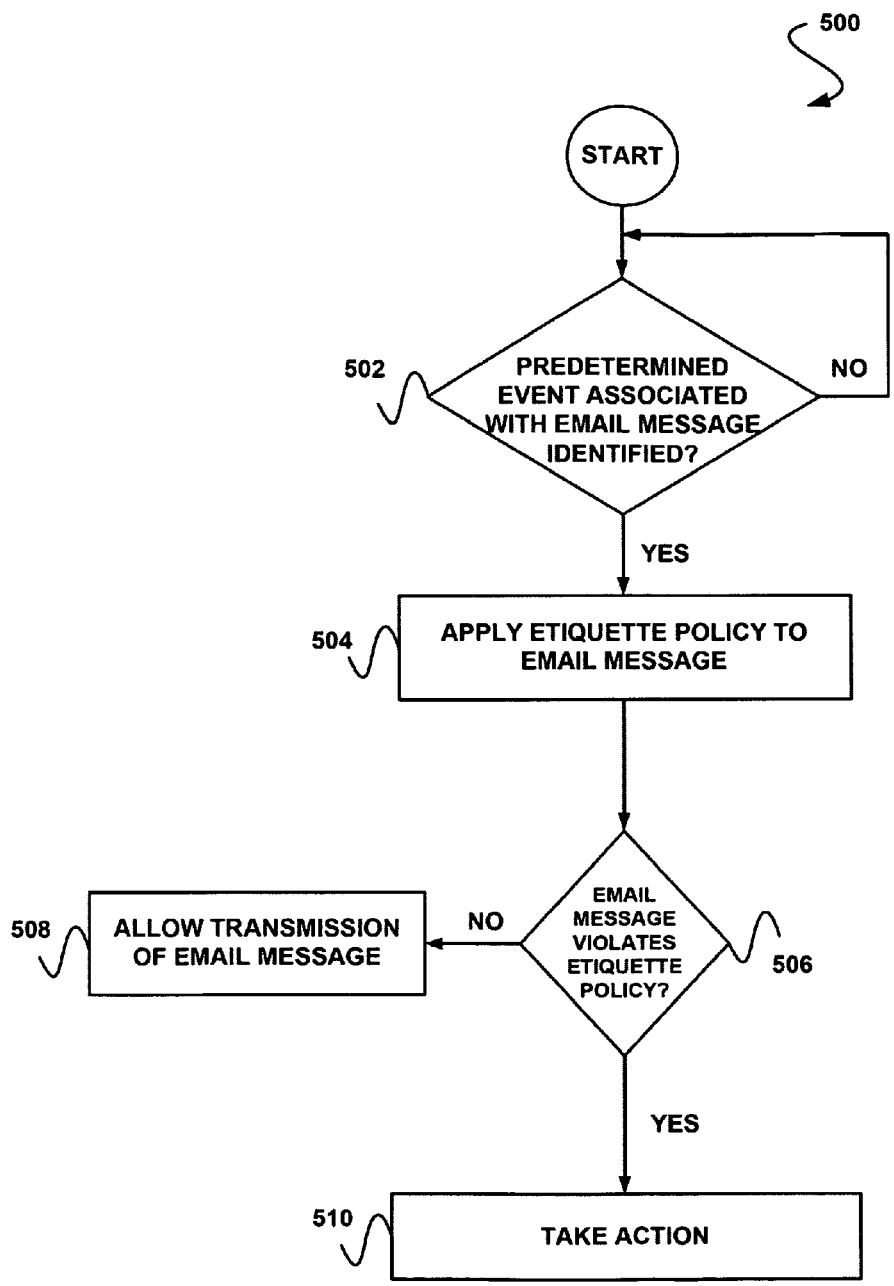
FIG. 5 shows a method for reacting based on a determination of whether an electronic mail message is compliant with an etiquette policy, in accordance with still yet another embodiment.

FIG. 5 shows a method 500 for reacting based on a determination of whether an electronic mail message is compliant with an etiquette policy, in accordance with still yet another embodiment. As an option, the method 500 may be carried out in the context of the architecture and environment of FIGS. 1-4B. Of course, however, the method 500 may be carried out in any desired environment. Again, it should be noted that the aforementioned definitions may apply during the present description.

As shown in decision 502, it is determined whether a predetermined event associated with an email message is identified. The email message may include any email message capable of being created, managed, sent, etc. by an email application. If it is determined that the predetermined event is not identified, the method 500 continues to wait for a predetermined event associated with an email message to be identified.

If, however, it is determined that the predetermined event is identified, an etiquette policy is applied to the email message. Note operation 504. The etiquette policy may be included in a set of etiquette policies. Thus, as an option, each of the etiquette policies in the set of etiquette policies may be applied to the email message. Applying the etiquette policy to the email message may include comparing the etiquette policy to the email message. For example, rules of the etiquette policy may be compared with characteristics of the email message.

Additionally, it is determined whether the email message complies with the etiquette policy, as shown in decision 506. For example, the determination may be made based on the comparison of the etiquette policy to the email message. In this way, it may optionally be determined whether the characteristics of the email message comply with the rules of the etiquette policy.

If it is determined that the email message complies with the etiquette policy, transmission of the email message is allowed. Note operation 508. As an option, the email message may be automatically transmitted if it is determined that the email message complies with the etiquette policy. Just by way of example, if the identified predetermined event (see decision 502) includes a user selection of an option to send the email message, the email message may be automatically transmitted in response to a determination that the email message complies with the etiquette policy.

Of course, as another option, the email message may only be transmitted after a manual selection for such transmittal, after it is determined that the email message complies with the etiquette policy. For example, if the identified predetermined event (see decision 502) does not include a user selection of an option to send the email message (e.g. includes instead a user selection of an option to determine whether the email message is compliant with the etiquette policy), the email message may only be transmitted after a selection by the user of the option to send the email. The email may optionally be flagged for indicating the compliance of the email with the etiquette policy, such that the email may be automatically transmitted in response to a user selection of an option to send the email message.

If it is determined that the email message does not comply with the etiquette policy, an action is taken. Note operation 510. In one embodiment, the action may include preventing transmittal of the email message. For example, if the identified predetermined event includes a user selection of an option to send the email message, automatic transmittal of the email message in response to such user selection may be prevented. As another example, if the identified predetermined event does not include a user selection of an option to send the email message (e.g. includes instead a user selection of an option to determine whether the email message is compliant with the etiquette policy), any transmittal of the email message based on a subsequent user selection of an option to send the email message may be prevented.

Figure 6A:
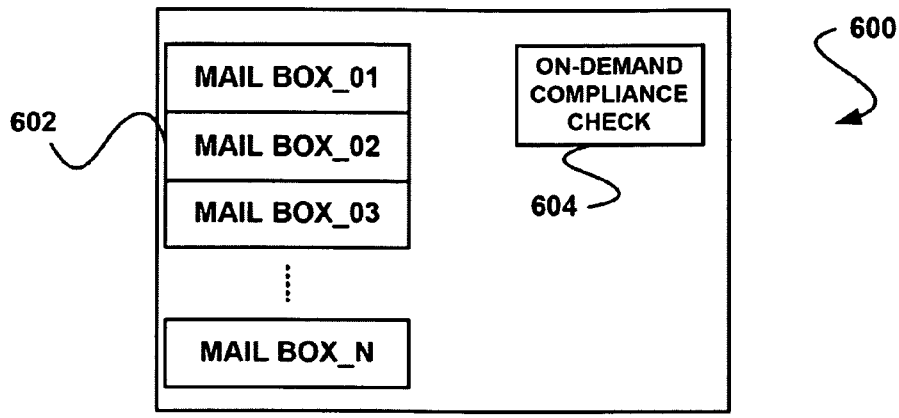
FIGS. 6A-6C show graphical user interfaces (GUIs) for initiating a determination of whether an electronic mail message is compliant with an etiquette policy, in accordance with another embodiment.
Figure 6B:
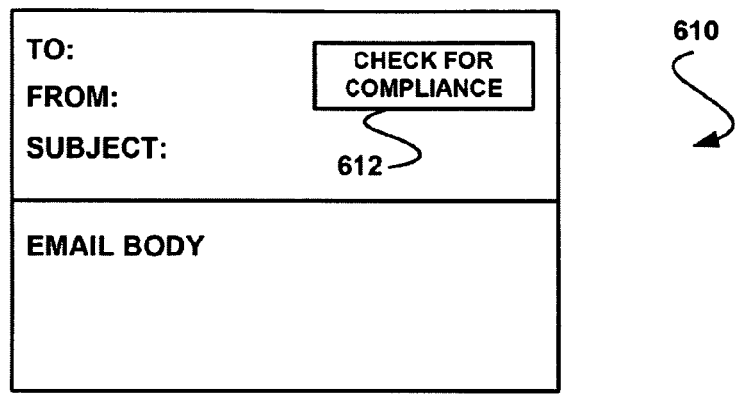
Figure 6C:
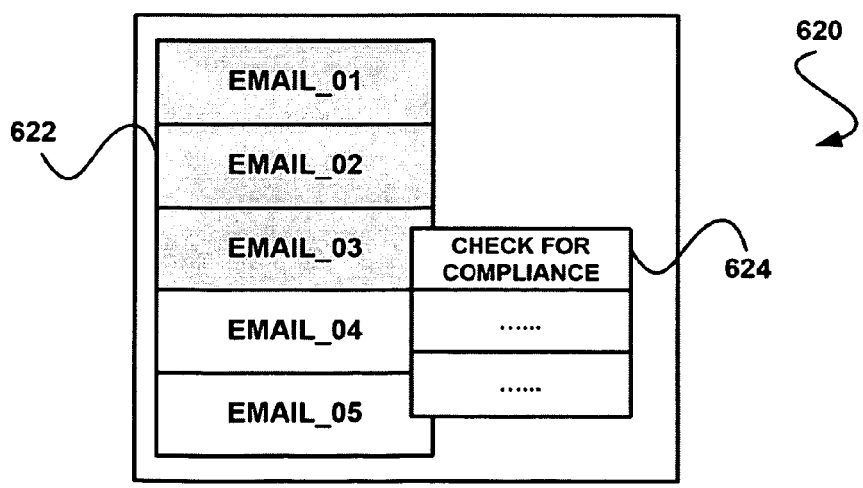

FIGS. 6A-6C show graphical user interfaces (GUIs) 600-620 for initiating a determination (i.e. in an on-demand manner) of whether an electronic mail message is compliant with an etiquette policy, in accordance with another embodiment. As an option, the GUIs 600-620 may be implemented in the context of the architecture and environment of FIGS. 1-5. Of course, however, the 600-620 may be implemented in any desired environment. Yet again, it should be noted that the aforementioned definitions may apply during the present description.

With respect to the GUIs 600-620 shown in FIGS. 6A-6B, it should be noted that the GUIs 600-620 may be utilized for generated a predetermined event, in response to which a determination of whether an electronic mail message is compliant with an etiquette policy may be made. For example, as shown in the GUI 600 of FIG. 6A, a plurality of mail boxes 602 may be displayed for selection thereof. Each of the mail boxes may 602 be associated with a different mail application of a client device. Thus, the GUI 600 may be displayed on a sever device that manages the various mail applications of client devices. Further, each of the mail boxes 602 may store email messages received by, generated by, etc. the associated mail application.

In one embodiment, at least one of the mail boxes 602 may be selected. For example, the mail box 602 may be selected by a user of the device via which the GUI 600 is displayed. As an option, the device may include a server device utilized by an organization, and the user may include an administrator of the organization.

In another embodiment, an option 604 to determine whether email messages included in the mail box 602 comply with an etiquette policy may be displayed for selection. The user of the device via which the GUI 600 is displayed may select the option 604, for example. Selection of such option 604 may include a predetermined event, such that it may be determined whether the email messages included in the mail box 602 are compliant with the etiquette policy.

As shown in the GUI 610 of FIG. 6B, contents of an email message are displayed. For example, the contents of the email message may be displayed during generation of the email message, editing of the email message, viewing of the email message, etc. Such contents may optionally include a designated recipient of the email message, a source of the email message, a body of the email message, etc.

Additionally, a selectable option 612 to determine whether the email message complies with an etiquette policy may displayed in the GUI 610 with the contents of the email message. The user of the device via which the GUI 600 is displayed may select the option 612, for example. Selection of such option 612 may include a predetermined event, such that it may be determined whether the email message is compliant with the etiquette policy.

As shown in the GUI 620 of FIG. 6C, a plurality of email messages 622 are displayed. In one embodiment, the email messages 622 may be displayed in response to selection of one of the mail boxes 602 of FIG. 6A. In another embodiment, the email messages 622 may be displayed automatically upon start-up of an email application of a device on which the GUI 620 is displayed (e.g. where the email messages 622 are included in an inbox of the email application), or upon selection of any other folder of the email application that stores email messages.

At least one of the email messages 622 may be selected (as shown, the three shaded email messages are selected). For example, a user of the device via which the GUI 620 is displayed may select the email messages 622. Upon selection of the email messages 622, a drop down menu of options may be displayed via the GUI 620.

As shown, one of such options may include a selectable option 624 to determine whether the selected email messages comply with an etiquette policy. Accordingly, the user of the device via which the GUI 620 is displayed may select the option 624. Selection of such option 624 may include a predetermined event, such that it may be determined whether the selected email messages are compliant with the etiquette policy.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non- transitory medium, comprising:
   computer code for identifying a predetermined event associated with an electronic mail message;
   computer code for determining whether the electronic mail message is compliant with an etiquette policy that designates a predefined number of acceptable distribution lists for the electronic mail message, wherein determining whether the electronic message is compliant with the etiquette policy includes comparing a number of distribution lists utilized by the electronic mail message to the predefined number of acceptable distribution lists indicated by the etiquette policy; and computer code for reacting, based on the determination, wherein if the electronic mail message complies with the etiquette policy then it is permitted to be transmitted to a next destination in a network, and wherein if the electronic mail message does not comply with the etiquette policy, it is quarantined and prevented from reaching the next destination.

2. The computer program product of claim 1, wherein the determining is carried out utilizing an application situated on a client device.

3. The computer program product of claim 1, and further comprising computer code for displaying indicia, wherein the predetermined event includes a selection of the indicia.

4. The computer program product of claim 3, wherein the indicia includes a send icon.

5. The computer program product of claim 3, wherein the indicia includes a check icon.

6. The computer program product of claim 2, wherein an update for the etiquette policy is received locally at the client device.

7. The computer program product of claim 2, wherein an update for the etiquette policy is received at the client device from a management server over a network.

8. The computer program product of claim 1, and further comprising computer code for allowing a user to select a plurality of electronic mail messages for being subject to the determining and reacting.

9. The computer program product of claim 1, wherein the determining is carried out at a server device.

10. The computer program product of claim 9, wherein an update for the etiquette policy is received locally at that server device.

11. The computer program product of claim 9, wherein an update for the etiquette policy is received from a different server including a management server over a network.

12. The computer program product of claim 1, wherein the predetermined event includes a receipt of the electronic mail message over a network.

13. The computer program product of claim 1, wherein the predetermined event includes a command received from an administrator.

14. The computer program product of claim 1, wherein the etiquette policy relates to a size of the electronic mail message.

15. The computer program product of claim 1, wherein the etiquette policy relates to a format of the electronic mail message.

16. The computer program product of claim 1, wherein the etiquette policy relates to a disclaimer included with the electronic mail message.

17. The computer program product of claim 1, wherein the etiquette policy relates to a signature of the electronic mail message.

18. The computer program product of claim 1, wherein the etiquette policy relates to a number of recipients of the electronic mail message.

19. The computer program product of claim 1, wherein the etiquette policy relates to at least one of a distribution list utilized by the electronic mail message, a type of attachment of the electronic mail message, a number of attachments of the electronic mail message, and a font of the electronic mail message.

20. The computer program product of claim 1, wherein the reacting includes at least one of quarantining the electronic mail message, deleting the electronic mail message, categorizing the electronic mail message, preventing the electronic mail message from being transmitted, and reporting the electronic mail message.

21. The computer program product of claim 1, wherein the reacting includes sending at least one of an event and data to a management server indicating a result of the determination.

22. The computer program product of claim 1, wherein the reacting includes notifying at least one of an information technology (IT) department, an IT administrator, and senior management.

23. The computer program product of claim 1, wherein the reacting includes logging a result of the determination.

24. A method, comprising:
identifying, at a server that includes a processor, a predetermined event associated with an electronic mail message generated by a first client device;
determining whether the electronic mail message is compliant with an etiquette policy that designates a predefined number of acceptable distribution lists for the electronic mail message, wherein determining whether the electronic message is compliant with the etiquette policy includes comparing a number of distribution lists utilized by the electronic mail message to the predefined number of acceptable distribution lists indicated by the etiquette policy; and
reacting, based on the determination, wherein if the electronic mail message complies with the etiquette policy then it is permitted to be transmitted to a second client device in a network, and wherein if the electronic mail message does not comply with the etiquette policy, it is quarantined and prevented from reaching the second client device.

25. A system, comprising:
a processor; and
a memory coupled to the processor, wherein the system is configured for:
identifying a predetermined event associated with an electronic mail message,
determining whether the electronic mail message is compliant with an etiquette policy that designates a predefined number of acceptable distribution lists for the electronic mail message, wherein determining whether the electronic message is compliant with the etiquette policy includes comparing a number of distribution lists utilized by the electronic mail message to the predefined number of acceptable distribution lists indicated by the etiquette policy, and
reacting, based on the determination, wherein if the electronic mail message complies with the etiquette policy then it is permitted to be transmitted to a next destination in a network, and wherein if the electronic mail message does not comply with the etiquette policy, it is quarantined and prevented from reaching the next destination.

26. The system of claim 25, wherein the processor is coupled to the memory via a bus.

* * * * *